US008595549B2

(12) United States Patent
Ninose (10) Patent No.: US 8,595,549 B2
(45) Date of Patent: *Nov. 26, 2013

(54) INFORMATION SYSTEM AND I/O PROCESSING METHOD

(71) Applicant: Kenta Ninose, Yokohama (JP)

(72) Inventor: Kenta Ninose, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/724,641

(22) Filed: Dec. 21, 2012

(65) Prior Publication Data

US 2013/0132767 A1 May 23, 2013

Related U.S. Application Data (63) Continuation of application No. 13/296,260, filed on Nov. 15, 2011, now Pat. No. 8,352,783, and a continuation of application No. 12/248,138, filed on Oct. 9, 2008, now Pat. No. 8,060,777.

(30) Foreign Application Priority Data

Apr. 28, 2008  (JP) ................................ 2008-117646

(51) Int. Cl.
*G06F 11/07* (2006.01)

(52) U.S. Cl.
USPC ............. 714/6.3; 714/6.1; 709/239; 709/242; 711/158

(58) Field of Classification Search
USPC ...................... 714/6.3; 709/239, 242; 711/158
See application file for complete search history.

(56) References Cited

U.S. PATENT DOCUMENTS

| 7,058,731 B2 | 6/2006 | Kodama |
| 2002/0108075 A1 | 8/2002 | Zilberman |
| 2004/0024975 A1 | 2/2004 | Morishita et al. |
| 2004/0068561 A1 | 4/2004 | Yamamoto et al. |
| 2005/0120174 A1 | 6/2005 | Uratani et al. |
| 2006/0010341 A1 | 1/2006 | Kodama |
| 2006/0179170 A1 | 8/2006 | Kodama |
| 2006/0195670 A1 | 8/2006 | Iwamura et al. |
| 2006/0248297 A1 | 11/2006 | Watanabe et al. |
| 2007/0101082 A1 | 5/2007 | Sugiura et al. |

FOREIGN PATENT DOCUMENTS

| EP | 1 857 918 | 11/2007 |
| JP | 2006-344090 | 12/2006 |
| WO | WO 2007/141125 | 12/2007 |

OTHER PUBLICATIONS

JP Office Action for Japanese Patent Application No. 2008-117646, issued on Oct. 16, 2012.

*Primary Examiner* — Chae Ko
(74) *Attorney, Agent, or Firm* — Antonelli, Terry, Stout & Kraus, LLP.

(57) ABSTRACT

Information system, including: first and second storage apparatuses connected to a host computer and including volumes designated by a common volume identifier, but being accessible via differing paths of differing priorities. A failure detection storage apparatus connected to the storage apparatuses includes a third volume. Any I/O request designating the common volume identifier, is first sent to the first volume though the first access path, but upon error is then sent to the second volume thorough the second access path. The first or second storage apparatus detecting failure stores, in the third volume, a failure information flag. Upon receiving an I/O request through the second access path, the second storage apparatus determines whether the failure information flag is stored in the third volume, and sends an error reply of the I/O request to the host computer if the failure information flag is stored in the third volume.

8 Claims, 6 Drawing Sheets

INFORMATION SYSTEM AND I/O PROCESSING METHOD

CROSS REFERENCE TO RELATED APPLICATION

This is a continuation of U.S. application Ser. No. 13/296,260, filed Nov. 15, 2011, which is a continuation of U.S. application Ser. No. 12/248,138, filed Oct. 9, 2008 (now U.S. Pat. No. 8,060,777). This application relates to and claims priority from Japanese Patent Application No. 2008-117646, filed on Apr. 28, 2008. The entirety of the contents and subject matter of all of the above is incorporated herein by reference.

BACKGROUND

The present invention relates to an information system including a plurality of storage systems.

In general, storage apparatuses using HDD (hard disk drives) as the storage device are mounted in an information system, and storage systems including such storage apparatuses are accessed from a plurality of host systems (for instance, hosts) via a storage area network (SAN). Generally speaking, storage apparatuses adopt a method of attaining high reliability according to RAID (Redundant Array of Independent (or Inexpensive) Disks) technology in order to provide the storage apparatuses with reliability that exceeds the reliability of stand-alone HDDs. Nevertheless, pursuant to the advancement of information society in recent years, the availability (service continuity) of information systems serviced with the reliability provided by the foregoing RAID technology is becoming inadequate.

As technology for realizing high availability to deal with the foregoing situation, the specification of U.S. Pat. No. 7,058,731 describes technology where a host and two storage systems are respectively connected, and data is remotely copied from one storage system to the other storage system. The entire disclosure of such reference is incorporated herein by reference.

SUMMARY

With the foregoing technology, if one of the storage systems fails and stops, it may be switched to another storage system to continue business. Nevertheless, in this case, the host requires special alternate path software for switching the storage systems, and this is not a versatile approach.

Thus, an object of the present invention is to improve the availability of an information system including a storage system for performing remote copy between two or more storage systems, and a host which does not include any special alternate path software.

In order to achieve the foregoing object, the present invention provides an information system comprising a host computer, first storage apparatus connected to the host computer and including a first volume, a second storage apparatus connected to the host computer and the first storage apparatus and including a second volume, and a third storage apparatus connected to the first storage apparatus and the second storage apparatus and including a third volume. The first and the second storage apparatuses respectively, internally set a remote copy pair for copying data of the first volume to the second volume, and associate the third volume with the remote copy pair according to an external command. When an I/O request to the first volume ends in an error, the host computer sends an I/O request directed to the second volume to the second storage apparatus. If the first and the second storage apparatuses detect a failure in the first or the second storage apparatus of the other side or a connection failure between the first and the second storage apparatuses, the first and the second storage apparatuses store in the third volume a failure information flag showing that a failure was detected.

The present invention additionally provides an I/O processing method in an information system comprising a host computer, a first storage apparatus connected to the host computer and including a first volume, a second storage apparatus connected to the host computer and the first storage apparatus and including a second volume, and a third storage apparatus connected to the first storage apparatus and the second storage apparatus and including a third volume. The I/O processing method comprises a first step of the first and the second storage apparatuses respectively, internally setting a remote copy pair for copying data of the first volume to the second volume, and associating the third volume with the remote copy pair according to an external command, a second step of the host computer sending, when an I/O request to the first volume ends in an error, an I/O request directed to the second volume to the second storage apparatus, and a third step of the first and the second storage apparatus storing in the third volume, if a failure in the first or the second storage apparatus of the other side or a connection failure between the first and the second storage apparatuses is detected, a failure information flag showing that the failure was detected.

Accordingly, since an I/O request is sent to the second volume when an I/O request to the first volume ends in an error, it is possible to effectively prevent the host computer from executing processing to an I/O request based on data of the second volume, which is not up to date, as a result of the remote copy with the first volume not being performed and data of the second volume not being up to date.

According to the present invention, it is possible to improve the availability of an information system.

DETAILED DESCRIPTION

Embodiments of the present invention are now explained in detail with reference to the attached drawings.

(1) First Example Embodiment

1. Configuration of Information System

Figure 1:
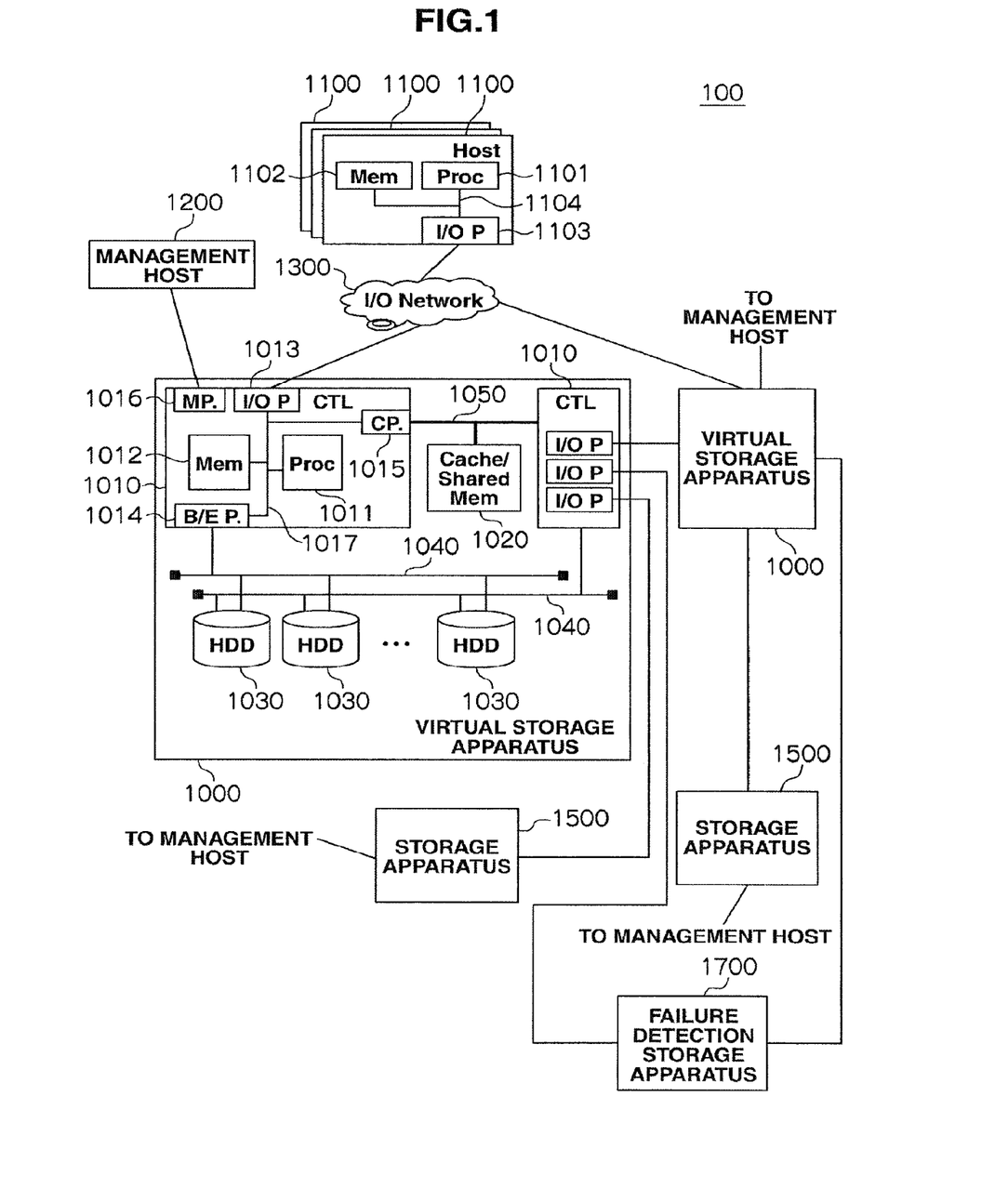
FIG. 1 is a block diagram showing an example of the hardware configuration of an information system according to an example embodiment of the present invention.

FIG. 1 is a diagram showing an example of the hardware configuration of an information system 100 according to an example embodiment of the present invention.

The information system 100 is configured from a storage apparatus 1500, a host computer (hereinafter abbreviated as "host") 1100, a management host 1200, two or more virtual storage apparatuses 1000, and so on. The number of storage apparatuses 1500, hosts 1100, and management hosts 1200 may be one or more, respectively. The virtual storage apparatus 1000 and the host 1100 are mutually connected via an I/O network 1300. The virtual storage apparatus 1000 and the storage apparatus 1500 and the management host 1200 are mutually connected via a management network (not shown) or the I/O network 1300.

The host 1100 has a host internal network 1104, and connected to this network 1104 are a processor (abbreviated as "Proc" in FIG. 1) 1101, a memory (abbreviated as "Mem" in FIG. 1) 1102, and an I/O port (abbreviated as "I/O P" in FIG. 1) 1103. The management host 1200 may also adopt the same hardware configuration as the host 1100. An expansion card for adding an I/O port to the host 1100 is sometimes referred to as an HBA (Host Bus Adapter).

The management host 1200 has a display device (not shown), and this display device is able to display a screen for managing the virtual storage apparatus 1000 and the storage apparatus 1500. The management host 1200 is also able to receive a management operation request from a user (for instance, the operator of the management host 1200), and send the received management operation request to the virtual storage apparatus 1000 and the storage apparatus 1500. The management operation request is a request for operating the virtual storage apparatus 1000 and the storage apparatus 1500 and there are, for example, operations relating to a parity group creation request, an internal LU (Logical Unit) creation request, a path definition request, and a virtualization function.

Although a fibre channel is foremost considered for the connection of the I/O network 1300, in addition, a combination of FICON (Fibre CONnection: registered trademark) and Ethernet (registered trademark) with TCP/IP (Transmission Control Protocol/Internet Protocol) and iSCSI (internet SCSI (Small Computer System Interface)), or a combination of Ethernet (registered trademark) and network file systems such as NFS (Network File System) and CIFS (Common Internet File System) may also be considered. Moreover, the I/O network 1300 may be a different communication device so as long as it is able to transfer the I/O request between network entities. The network connecting the virtual storage apparatus 1000 and the storage apparatus 1500 may be the same as the I/O network 1300.

The virtual storage apparatus 1000 includes a controller (indicated as "CTL" in FIG. 1) 1010, a cache memory (indicated as "CM" in FIG. 1) 1020, and a plurality of HDDs 1030. As a preferred mode, the controller 1010 and the cache memory 1020 are respectively configured from a plurality of components. This is so that, even if a failure occurs in a stand-alone component and such component is blocked, I/O requests as represented by the reading and writing of data can be continuously received using the remaining components.

The controller 1010 is an apparatus (for instance a circuit board) for controlling the operation of the virtual storage apparatus 1000. The controller 1010 has an internal network 1017, and connected to this internal network 1017 are an I/O port 1013, a cache port (indicated as "CP" in FIG. 1) 1015, a management port (indicated as "MP" in FIG. 1) 1016, a backend port (indicated as "B/E P" in FIG. 1) 1014, a processor (for instance a CPU (Central Processing Unit)) 1011, and a memory 1012. The controllers 1010 and the cache memory 1020 are mutually connected via the storage internal network 1050. The controller 1010 and each HDD 1030 are mutually connected via a plurality of backend networks 1040.

The hardware configuration of the storage apparatus 1500 may be configured from the same type of components as the virtual storage apparatus 1000. If the virtual storage apparatus 1000 is a dedicated virtualization apparatus or a switch that is not equipped with an HDD, the storage apparatus 1500 does not need to be configured from the same type of components as the virtual storage apparatus 1000. The internal network of the host 1100 and the virtual storage apparatus 1000 is preferably a broader band than the transfer band of the I/O port 1013, and all or a part thereof may be substituted with a bus or a switch-type network. Although FIG. 1 shows one I/O port 1013 in the controller 1010, in reality a plurality of I/O ports 1013 may exist in the controller 1010.

Based on the foregoing hardware configuration, the host 1100 will be able to read and write all or a part of the data retained in the virtual storage apparatus 1000 or the HDD of the storage apparatus 1500. In the ensuing explanation, the system in charge of data storage is referred to as a storage cluster. In addition, a subsystem that realizes high availability by including two types of systems in the storage cluster and which includes one or both of the virtual storage apparatus 1000 and the storage apparatus 1500, is referred to as a storage subsystem.

2. Outline of Present Example Embodiment

Figure 2:
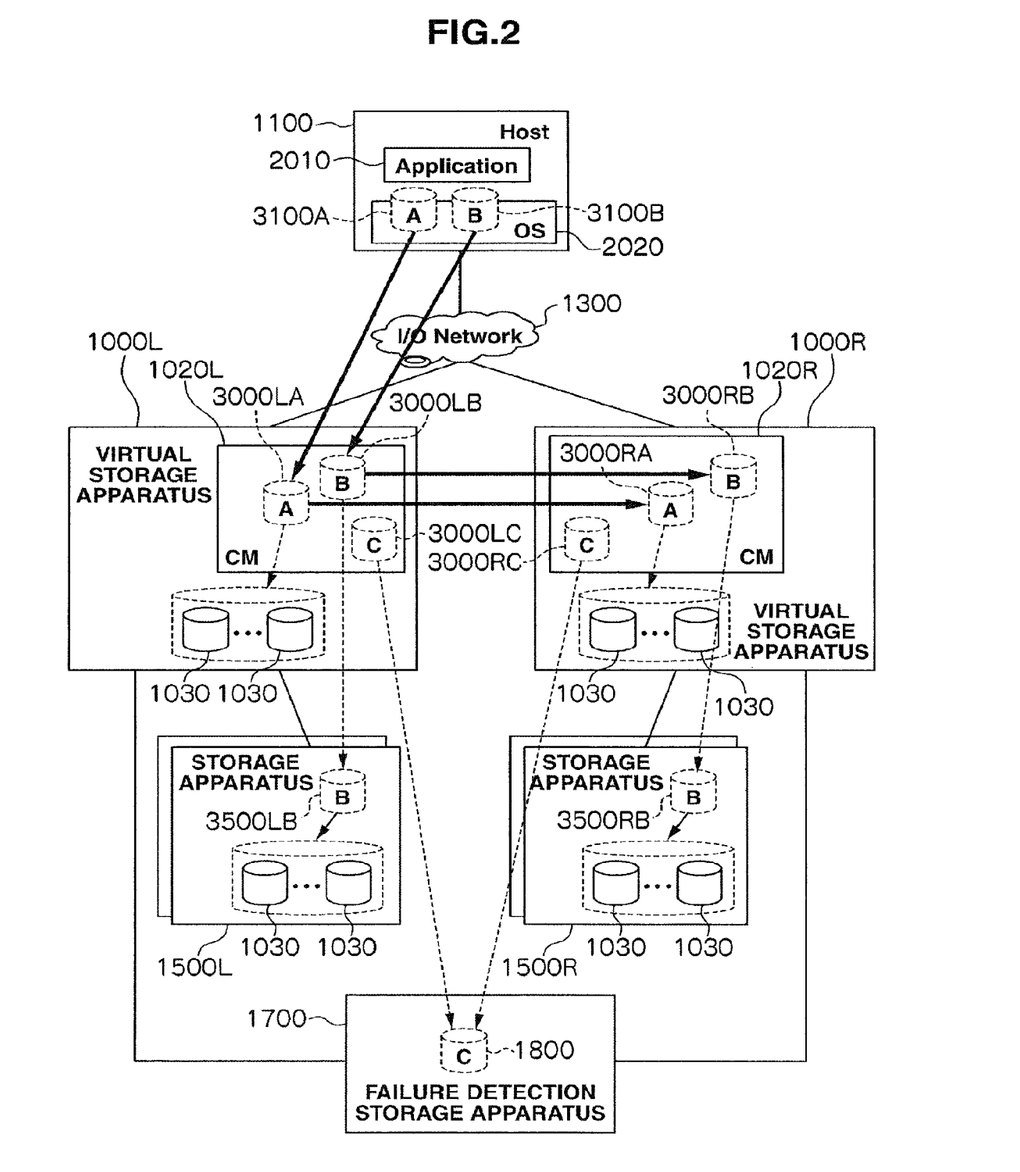
FIG. 2 is a conceptual diagram showing an example outline of an example embodiment of the present invention.

In this example embodiment, in order to improve the availability of a storage system including the virtual storage apparatus 1000 with a virtualization function for virtualizing a storage area of a volume or the like in another storage apparatus 1500, a duplexed configuration using another virtual storage apparatus 1000 is adopted. FIG. 2 is a diagram showing an outline of this duplexed configuration.

In this outline, the storage system includes a virtual storage apparatus 1000L, a virtual storage apparatus 1000R, a storage apparatus 1500L, and a storage apparatus 1500R. For ease of understanding in the ensuing explanation, let it be assumed that the virtual storage apparatus 1000L and the storage apparatus 1500L function as the primary system (production system), and the virtual storage apparatus 1000R and the storage apparatus 1500R function as the secondary system (backup system). Nevertheless, if there are two or more volumes to be provided by the respective virtual storage apparatuses 1000L, 1000R to the host 1100, in substitute for the primary system and the secondary system being handled in virtual storage apparatus units, it would suffice so as long as the virtual storage apparatuses 1000L, 1000R to handle the primary system in volume units are defined.

The respective virtual storage apparatuses 1000L, 1000R provide a part or all of the areas of a parity group (configured with RAID technology) that uses its own HDD 1030 as the system component as a volume 3000LA, 3000RA to the host 1100 (corresponds to the portion indicated as 'A' in the cylinder of FIG. 2). The virtual storage apparatus 1000 may also optionally provide a virtual volume 3000LB, 3000RB (volume in which a nonvolatile storage area of a corresponding HDD or the like exists outside the virtual storage apparatuses 1000L, 1000R) based on the virtualization function (corresponds to the portion indicated as 'B' in the cylinder of FIG. 2). In this outline, a part or all of the volumes 3500LB, 3500RB provided by the storage apparatuses 1500L, 1500R are used as the corresponding nonvolatile storage area.

In the ensuing explanation, the term "volume data" includes, in addition to the data stored in the HDD 1030, data that is temporarily stored in the cache memory 1020. Moreover, the term "virtual volume data" described later includes, in addition to the data stored in the volumes 3500LB, 3500RB of the storage apparatuses 1500L, 1500R, data that is temporarily stored in the cache memory 120 of the virtual storage apparatuses 1000L, 1000R.

Meanwhile, an application program (hereinafter sometimes abbreviated as "application") 2010 and an OS (Operating System) 2020 are running on the host 1100. If there are a plurality of access paths in a single volume 3000, alternate path software with a function of collectively handling such plurality of access paths may be running as a part of the OS 2020.

The application 2010 uses an interface provided by the OS 2020 and accesses data in the virtual storage apparatus 1000. The OS 2020 interprets the access request from the application 2010 and, in order to identify the requested data, designates a volume address (for instance, represented as a combination of a target port address and LUN with a SCSI standard) of the volume 3000 provided by the virtual storage apparatus 1000 and a data location (shown as LBA with a SCSI standard) in the volume 3000, and issues an I/O request to the virtual storage apparatus 1000.

The virtual storage apparatus 1000 accesses (reads or writes) the data stored in the designated LBA of the designated volume 3000, and replies with the result to the host 1100. The OS 2020 of the host 1100 receives the result returned from the virtual storage apparatus 1000, and returns the result to the application 2010.

The alternate path software intervenes in the exchange between the application 2010 and the OS 2020, and has a function of selecting the access path to be used when a single volume comprises a plurality of access paths. With the SCSI standard, if one volume 3000 comprises a plurality of access paths, a different volume address (that is, a combination of the target port address and LUN) is allocated to the respective access paths. In other words, a single volume will have a plurality of volume addresses.

The alternate path software selects one of the volume addresses (that is, one of the access paths) and requests the OS 2020 to issue an I/O request. The OS 2020 uses the access path selected by the alternate path software, issues an I/O request to the virtual storage apparatus 1000, receives the result from the virtual storage apparatus 1000, and returns the result to the alternate path software. The alternate path software returns the result as is to the application 2010 if the result is an I/O success. If the result is an I/O error, the alternate path software selects a separate access path and once again requests the OS 2020 to issue an I/O request. If all access paths are subject to I/O error, the I/O error is replied to the application 2010.

The alternate path software uses a volume identifier as an identifier that is unique to the volume (hereinafter referred to as a "unique volume identifier") in order to know whether a plurality of volume addresses are associated with a single volume. The alternate path software makes an inquiry to the virtual storage apparatus 1000 regarding the volume identifier of each of the plurality of volume addresses. With the SCSI standard, an Inquiry command is used. The virtual storage apparatus 1000 replies with the unique volume identifier to the alternate path software. Since the volume identifier is a unique volume identifier, even if the volume address is different, the same identifier is returned if the volume 3000 is the same. Thereby, the alternate path software is able to recognize that the volume addresses returning the same volume identifier are the plurality of access paths to a single volume.

The alternate path software also acquires the priority of the access paths. With the SCSI standard, the priority is returned to the alternate path software together with the identifier as the reply of the Inquiry command. Generally, priority is represented in the two stages of high or low. In other words, the alternate path software is able to obtain information such as a certain access path having high priority and a separate access path having low priority. When the alternate path software acquires the priority, it selects an access path with high priority upon selecting the access path, and requests the OS 2020 to use the selected access path and issue an I/O request. If there are three or more access paths, the access path to be used is foremost selected among the access paths with high priority. The alternate path software selects an access path with low priority and requests the OS 2020 to issue an I/O request only when all I/O requests using access paths with high priority ends in an error.

The volumes 3000LA, 3000RA, 3000LB, 3000RB provided by the virtual storage apparatuses 1000L, 1000R shown in FIG. 2 are of a remote copy relationship. Remote copy is a function loaded in the virtual storage apparatus 1000 of copying write data received by the volume 3000 of a certain virtual storage apparatus 1000 to the volume 3000 of another virtual storage apparatus 1000. The copy source volume is referred to as a primary volume, and the copy destination volume is referred to as a secondary volume.

In this embodiment, the virtual storage apparatus 1000L is set as the virtual storage apparatus 1000 with high priority, and the virtual storage apparatus 1000R is set as the virtual storage apparatus 1000 with low priority. In FIG. 2, the volumes 3000LA, 3000LB are primary volumes, and the volumes 3000RA, 3000RB are secondary volumes.

Although the basic function of the remote copy in this embodiment is somewhat equivalent to standard remote copy, certain functions differ from the standard remote copy. Some important characteristic functions of this embodiment are explained below. Foremost, with the remote copy of this example embodiment, the volume identifier of the primary volume and the volume identifier of the secondary volume are made to be the same. Specifically, the volume 3000LA and the volume 3000RA reply with the same volume identifier to the SCSI Inquiry command. Consequently, the alternate path software of the host 1100 recognizes the volumes 3000LA and 3000RA, which are different volumes under ordinary circumstances, as a single volume, and recognizes the respective volumes as a plurality of access paths to that single volume.

Regarding the priority of access paths also, the primary volume replies with an access path with high priority and the secondary volume replies with an access path with low priority. As a result of adopting this kind of configuration, since the alternate path software will process the I/O using an access path with high priority, it will consequently issue an I/O request to the primary volume. The alternate path software selects a low priority access path only when the I/O with all high priority access paths ends in an error (that is, only when the I/O to the primary volume ends in an error); in other words, it issues an I/O request to the secondary volume.

One characteristic function of the secondary volume in the remote copy of this embodiment is that, upon receiving an I/O request from the host 1100, the remote copy is stopped and the I/O processing is started. If a host I/O is issued to the secondary volume based on the foregoing volume identifier and the access path priority, this means that the I/O to the primary volumes (that is, to the high priority access paths) all ended in an error. Here, by starting the I/O processing with the reception of the I/O request by the secondary volume as the trigger, the alternate path software will determine that the I/O was successful as a result of selecting a low priority access path. Thereby, a failover of the virtual storage apparatus 1000 can be realized with the functions available in standard alternate path software.

Like this, with the information system 100, the alternate path software is not given a special function, and the switching of the virtual storage apparatus 1000L and the virtual storage apparatus 1000R is realized by the virtual storage apparatus 1000L and the virtual storage apparatus 1000R sending a reply to the I/O request in accordance with the functions of existing alternate path software.

Although the processing subject of the various types of processing of the application 2010, the OS 2020, and the alternate path software was explained as a program in order to clarify the processing contents of the processor 1011 of the host 1100 based on the respective programs, in reality, it goes without saying that the processor 1011 of the host 110 performs the foregoing processing based on the relevant programs.

Figure 3:
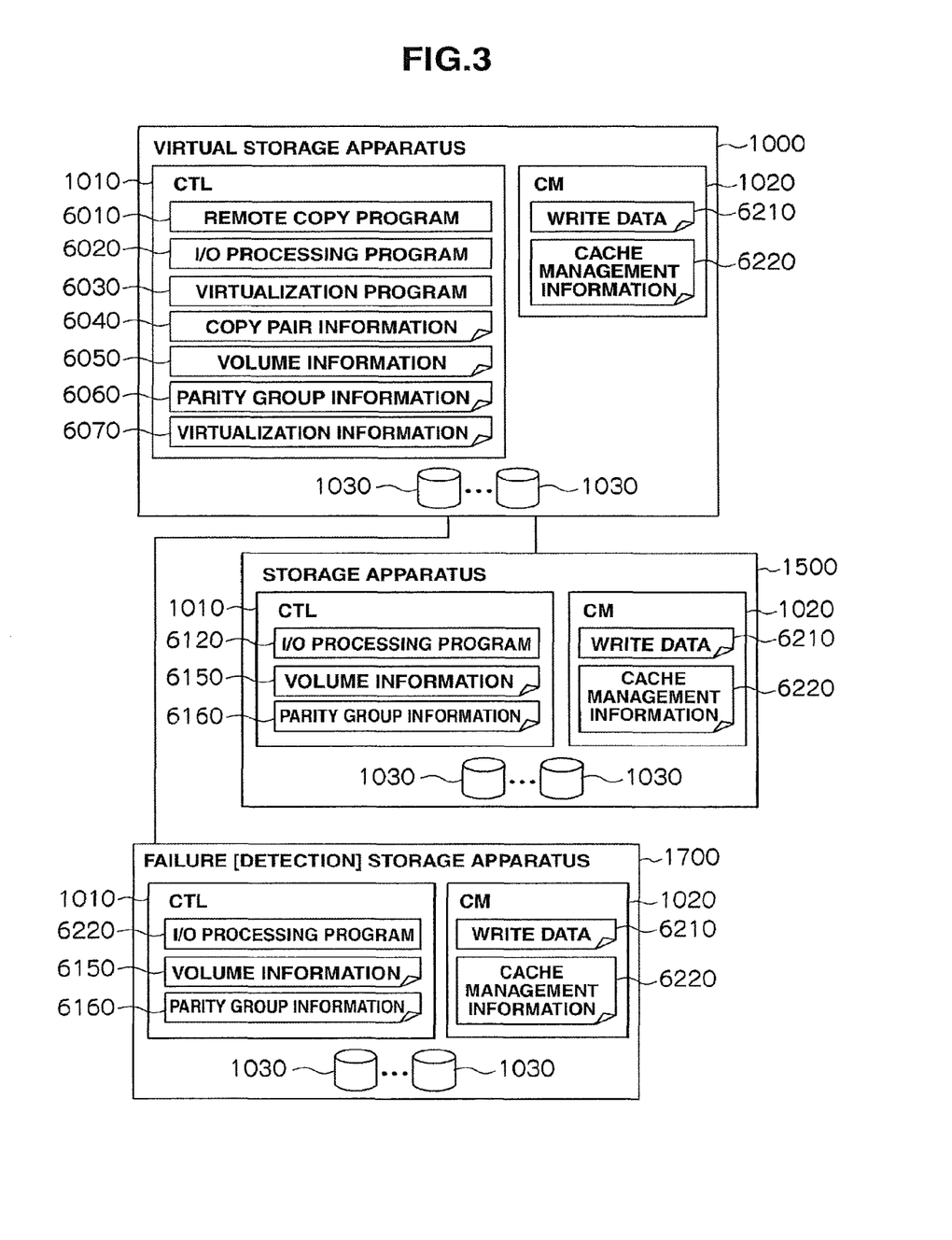
FIG. 3 is a block diagram representing an example software configuration in a virtual storage apparatus, storage apparatus and failure detection storage apparatus.

3. Example Programs to be Executed with Virtual Storage Apparatus 1000 and Example Information Managed by Programs FIG. 3 is a diagram shows example programs to be executed by the virtual storage apparatuses 1000 (1000L, 1000R) and the storage apparatuses 1500 (1500L, 1500R), and example information to be managed by these programs. Although these programs are retained in the memory 1012 (FIG. 1), the processor 1011 (FIG. 1), and the cache memory 1020 and executed, the programs may also be partially configured as hardware and executed.

3.1. Example I/O Processing Program 6020, 6120, Parity Group Information 6060, 6160 and Volume Information 6050, 6150

The example parity group information 6060 includes information related to the following configuration for each parity group.
(1) Identifiers of the HDDs 1030 configuring the parity group. Since a plurality of HDDs 1030 are participating in the parity group, a plurality of identifiers (information) exist for each parity group.
(2) RAID level The volume information 6050 includes information related to the following configuration for each volume.
(1) Volume capacity
(2) Identifier of parity group retaining data corresponding to the volume and area (start address and/or end address) in the parity group.

The I/O processing program 6020 refers to the volume information 6050 and the parity group information 6060 and executes the following processing regarding the I/O request received from the host 1100.
(A) Staging: Data stored in the HDD 1030 is copied in the cache memory 1020.
(B) Destaging: Data stored in the cache memory 1020 is copied to the HDD 1030. Redundant data may be created with RAID technology as preprocessing.
(C) Read processing: In response to a read request received from the host 1100, whether data corresponding to that request exists in the cache memory 1020 is determined. If data corresponding to that request does not exist in the cache memory 1020, staging processing is executed to copy that data in the cache memory 1020, and that data is thereafter sent to the host 1100. If corresponding data exists in the cache memory 1020, that data is sent to the host 1100.
(D) Write processing: Write data 6210 received from the host 1100 is stored in the cache memory 1020. If the unused area in the cache memory 1020 is insufficient during the processing, destaging processing is executed to copy appropriate data to the HDD 1030, and that area is thereafter diverted to the cache memory 1020. If the area previously stored in the cache memory 1020 is included in the write request, there are cases where such area is overwritten on the area in the existing cache memory 1020.
(E) Cache algorithm: Data in the HDD 1030 to be staged and data in the cache memory 1020 to be destaged are determined according to an algorithm such as LRU based on the frequency or timing of referral of data in the cache memory 1020.

3.2. Example Virtualization Program 6030 and Virtualized Information 6070

The virtualized information 6070 includes information related to the following configuration for each virtual volume.
(1) Information on the area in the volume of the storage apparatus 1500 and information concerning the area to be provided to the host 1100 as which area of the address space in the virtual volume. If the configuration includes a plurality of virtual volumes, the following information also exists in a plurality.
(1-1) Identifier of the storage apparatus 1500 (or identifier of the port) configuring the virtual volume, identifier of the volume, and area in the volume (start address and end address)
(1-2) Areas (start address and end address) in virtual volume
(2) Capacity of virtual volume The virtualization program 6030 is a program for the virtual storage apparatus 1000 to provide a volume to the host 1100 using the volume provided by the storage apparatus 1500. As the correspondence relationship of the virtual volume 3000B (don't see this reference number in drawings?) provided by the virtualization program 6030 and the volume 3500B in the corresponding storage apparatus 1500, there are the following patterns.
(A) A case of using the overall volume in the storage apparatus 1500 as the storage area of the virtual volume 3000B (don't see this reference number in drawings; see many additional occurrences in spec). In this case, the capacity of the virtual volume will be approximately the same capacity as the selected volume 3500B (Case of storing control information and redundant information in the volume of the storage apparatus 1500. If there is no such information, this will be the same capacity).
(B) A case of using a partial area of the volume in the storage apparatus 1500 as the storage area corresponding to the virtual volume 3000B. In this case, the capacity of the virtual volume 3000B will be roughly the same as the area capacity to be used.
(C) A case of combining a plurality of volumes 3500B in a plurality of storage apparatuses 1500 and using this as a storage area of the virtual volume 3000B. In this case, the capacity of the virtual volume 3000B will be roughly the same as the total value of the respective volume capacities. As the combination method, striping, Concatenate (connecting a plurality of volumes and handling them as a single volume) or the like may be used.
(D) A case of storing parity information and mirror data incidental to the pattern of (C). In this case, the capacity of the virtual volume 3000B will be half of (C) when storing mirror data, and will depend on the parity calculation method when storing parity. By combining the high reliability based on RAID in the storage apparatus 1500, reliability regarding the data stored in the virtual volume 3000B can be improved even further.

In all of the foregoing patterns, the storage apparatus identifier (or port identifier) and the volume identifier (information used in the I/O request for identifying the volume in the virtual storage apparatus or under the control of the port; LUN (Logical Unit Number), and the CU number in CKD format and the LDEV (Logical DEVice) number, etc.) will differ from the original volume.

The virtualization program 6030 is called by the I/O processing program 6020 when the data to be subject to staging or destaging corresponds to the virtual volume, and executes the following processing using the virtualized information 6070.

(A) Staging: After deciding from which storage apparatus 1500 the data stored in its volume 3500B is to be copied in the cache memory 1020 based on the correspondence relationship of the virtual volume 3000B and the volume 3500B of the storage apparatus 1500, data is copied in the cache memory 1020.

(B) Destaging: After deciding to which volume 3500B of which storage apparatus 1500 the data stored in cache memory 1020 is to be copied based on the correspondence relationship of the virtual volume 3000B and the volume 3500B of the storage apparatus 1500, data is copied to the volume 3500B of the storage apparatus 1500. Here, redundant data may be created with RAID technology as preprocessing.

3.3. Remote Copy Program 6010 and Copy Pair Information 6040

The copy pair information 6040 retains the following information for each copy pair (sometimes abbreviated as "pair") of the primary volume and the secondary volume of remote copy. In this embodiment, target volumes for realizing high availability are designated as the primary volume and the secondary volume.

(1) Identifier of the virtual storage apparatus 1000 retaining the primary volume and identifier of the volume
(2) Identifier of the virtual storage apparatus 1000 retaining the secondary volume and identifier of the volume
(3) Copy pair status (to be described in detail later)

The remote copy program 6010 is a program for mirroring the data stored in the primary volume to the secondary volume, and performs processing by referring to the copy pair information 6040. The outline of processing and the pair status of remote copy (in particular synchronous remote copy) are explained below.

3.3.1. Copy Processing Operation of Synchronous Remote Copy

Synchronous remote copy is a method of remote copy where, as described above, when the copy source virtual storage apparatus 1000 receives a write request from the host 1100 for writing data into the primary volume, it sends the write data to the copy destination virtual storage apparatus 1000, and thereafter returns a write request completion to the host 1100.

Figure 4:
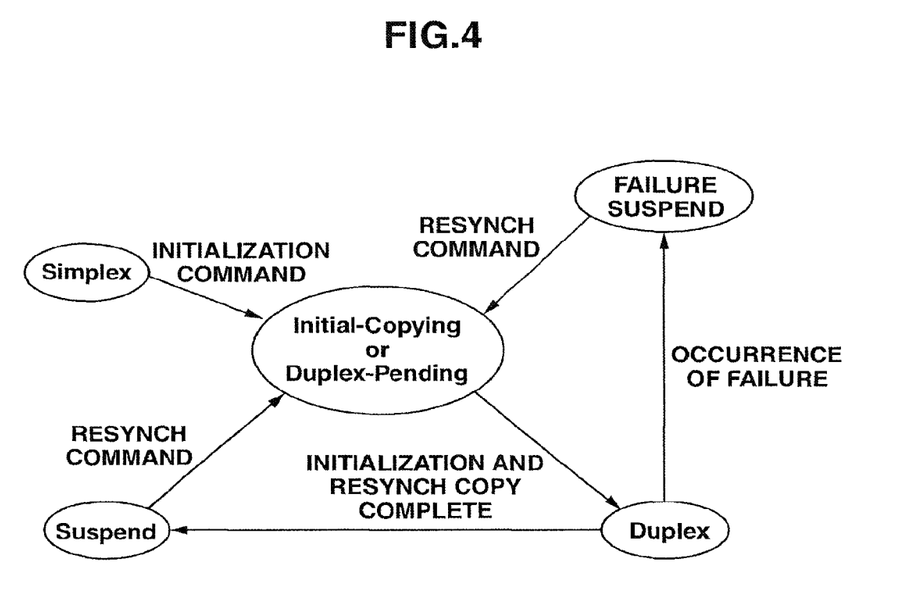
FIG. 4 is a conceptual diagram representing an example pair status of an example remote copy and an example transition of the pair status.

When synchronous remote copy is to be executed, the controller 1010 of the virtual storage apparatus 1000 manages information referred to as a copy pair status (Simplex, Initial-Copying, Duplex, Suspend and Duplex-Pending) in order to display the remote copy status between the pair of primary volume and secondary volume on the management host 1200, or operate the remote copy status. FIG. 4 shows a status transition diagram concerning the pair status of synchronous remote copy. Each pair status is explained below.

3.3.1.1. Simplex Status

The Simplex status is a status where the copy between the primary volume and secondary volume configuring a pair has not started.

3.3.1.2. Duplex Status

The Duplex status is a status where the synchronous remote copy has been started, the initialization copy described later is complete, and the contents of the primary volume and the contents of the secondary volume configuring a pair are identical. In this status, excluding the area that is currently being written, the contents of the primary volume data and the contents of the secondary volume data will be the same. During Duplex and in the Duplex-Pending status and the Initial-Copying status, the write request from the host 1100 to the secondary volume is denied.

3.3.1.3. Initial-Copying Status

The Initial-Copying status is an intermediate status while the status changes from the Simplex status to the Duplex status, and initialization copy from the primary volume to the secondary volume (copy of data previously stored in the primary volume to the secondary volume) is performed during this period as needed. When the initialization copy is complete and the necessary processing for changing to the Duplex status is complete, the pair status becomes Duplex.

3.3.1.4. Suspend Status

The Suspend status is a status where the contents written into the primary volume are not reflected in the secondary volume. In this status, the contents of the primary volume data and the contents of the secondary volume data configuring a pair are not the same. With a command from the user or the host 1100 as the trigger, the pair status changes from another status to the Suspend status. In addition, when synchronous remote copy can no longer be performed due to a network failure or the like between the virtual storage apparatuses 1000, the pair status may also be automatically changed to the Suspend status.

In the ensuing explanation, in the latter case; that is, the Suspend status caused by the occurrence of a failure is referred to as the failure Suspend status. As a representative cause for the pair status to become a failure Suspend status, in addition to a network failure, a failure in the primary volume or the secondary volume, or a failure in the controller 1010 can also be considered.

When the pair status becomes a Suspend status and there is a write request to the primary volume after the point in time that the pair status become the Suspend status, the copy source storage 1000 receives write data according to the write request and stores this in the primary volume, but does not send the write data to the copy destination virtual storage apparatus 1000. In addition, the copy source virtual storage apparatus 1000 stores the location in the primary volume where the write data was written as a differential bitmap or the like.

3.3.1.5. Duplex-Pending Status

The Duplex-Pending status is an intermediate status while the status changes from the Suspend status to the Duplex status. In this status, in order to make the contents of the primary volume data and the contents of the secondary volume data coincide, data is copied from the primary volume to the secondary volume. After the contents of the primary volume data and the contents of the secondary volume data become the same, the pair status becomes Duplex.

The copying of data in the Duplex-Pending status is executed based on differential copy of copying only the portions that need to be updated (that is, the non-coinciding portions in the primary volume data and the secondary volume data) by using the write location (for instance, the foregoing differential bitmap or the like) recorded in the copy source virtual storage apparatus 1000 or the copy destination virtual storage apparatus 1000 during the Suspend status.

Although the Initial-Copying status and the Duplex-Pending status were explained to be separate statuses above, these may also be combined into one status and displayed on the screen of the management host 1200 or changed to a different status.

4. Example Programs to be Executed with Storage Apparatus 1500 and Example Information to be Managed by Programs FIG. 3 shows example programs to be executed by the storage apparatus 1500 and example information to be managed by the programs, and these programs and information perform the same operations as the virtual storage apparatus 1000.

5. Example Characteristic Configuration of Present Embodiment

In addition to the foregoing configuration, in this example embodiment, the virtual storage apparatuses 1000L, 1000R of the information system 100 and the failure detection storage apparatus 1700 are mutually connected via a prescribed network (FIG. 1). The hardware configuration of the failure detection storage apparatus 1700 may be configured from the same type of components as the virtual storage apparatus 1000.

The failure detection storage apparatus 1700 provides a part or all of the areas of a parity group that uses its own HDD 1030 as the system component as a failure detection volume 1800 to the virtual storage apparatuses 1000L, 1000R. Here, with the virtual storage apparatuses 1000L, 1000R, the same failure detection volume 1800 will have been provided as the failure detection virtual volume 3000C (cannot find this reference number in the FIGS; see other occurrences of this reference number in spec) (FIG. 2).

The failure detection storage apparatus 1700 stores failure information showing whether a failure has occurred in the system component of the information system 100 in the failure detection volume 1800.

Moreover, the programs and information to be executed in the failure detection storage apparatus 1700 perform the same operations as the virtual storage apparatus 1000 to the failure detection flag described later (FIG. 3).

Specifically, the I/O processing program 6220 of the failure detection storage apparatus 1700 performs processing for checking the failure detection flag (described later) and writing (storing) the failure detection flag in the corresponding failure detection volume 1800 based on the control of the processor 1011 of the failure detection storage apparatus 1700 and according to a command from the virtual storage apparatuses 1000L, 1000R (FIG. 3).

Meanwhile, the virtual storage apparatuses 1000L, 1000R retain the following four pieces of information in the copy pair information 6040 in order to associate and set the copy pair of the primary volume and secondary volume of remote copy with the failure detection volume 1800 upon creating such pair of the primary volume and secondary volume of remote copy. Specifically, the copy pair information 6040 of this embodiment has the following example information, and such information are associated and set.

(1) Identifier of the virtual storage apparatus 1000 retaining the primary volume and identifier of the volume
(2) Identifier of the virtual storage apparatus 1000 retaining the secondary volume and identifier of the volume
(3) Copy pair status
(4) Identifier of the failure detection volume (failure detection virtual volume 3000C) and address of data storing the failure information The characteristic processing contents of the I/O processing program 6020 of the virtual storage apparatuses 1000L, 1000R in this embodiment will be described later.

The I/O request processing, which is characteristic processing of remote copy in this embodiment, is now explained. With the I/O request processing of remote copy in this embodiment, since the I/O is processed while avoiding a failure, it is necessary to perform processing while satisfying the following requirements.

With the information system 100 in this embodiment, foremost, even if a failure (single point of failure) occurs in one of the system components of the information system 100, it is necessary to continue the I/O processing by re-issuing an I/O request from the host 1100 and avoid replying an I/O error to the host 1100.

In other words, in order to make the availability of the information system 100 in this embodiment higher than a stand-alone virtual storage apparatus, it is necessary to continue the I/O processing in the host 1100 even if a single point of failure occurs. With the information system 100, for example, if the I/O request itself is replied as an I/O error to the host 1100 due to a remote copy error, the I/O processing in the host 1100 cannot be continued due to the single point of failure of the virtual storage apparatus 1000L. Thus, with the information system 100, it is necessary to avoid this kind of processing.

Furthermore, with the information system 100 in this embodiment, secondly, even when a failure (multiple failure) occurs in a plurality of system components of the information system 100, it is necessary to avoid erroneously accessing old data. Here, the continuity of the I/O processing in the host 1100 is no object.

Here, old data refers to data that is at variance with the data in the volume 3100 recognized by the host 1100, and a typical example would be the data in the volume 3000RA of the virtual storage apparatus 1000R in a case where the virtual storage apparatus 1000L (high priority virtual storage apparatus 1000) is being operated independently after the link between the virtual storage apparatuses 1000L, 1000R is disconnected.

In other words, since the information system 100 of this embodiment is a redundant system of a production system and a backup system, when a failure occurs in a plurality of system components, depending on the failed portion, there may be cases where the continuation of the I/O processing of the host 1100 becomes impossible.

Here, with the information system 100, when there is time during the occurrence of the single point of failure to the occurrence of the next failure, there may be cases where data (old data) to which the write request issued after the occurrence of the single point of failure is not reflected exists in either the virtual storage apparatus 1000L or the virtual storage apparatus 1000R.

Accordingly, with the information system 100, it is necessary to prevent the host 1100 from erroneously accessing the old data. With the information system 100, for instance, if the remote copy ends in an error (occurrence of single point of failure) due to the occurrence of a single point of failure caused by a connection failure or the like due to a disconnection between the virtual storage apparatuses 1000L, 1000R, considered may be a case of simply processing the I/O request independently with the virtual storage apparatus 1000L. Here, with the information system 100, when a failure (multiple failure) subsequently occurs in the virtual storage apparatus 1000L a while later, since the host 1100 reissues the I/O request to the virtual storage apparatus 1000R with an I/O error to the virtual storage apparatus 1000L as the trigger, the host 1100 will access the old data of the virtual storage apparatus 1000R.

Thus, with the information system 100 of this embodiment, a failure detection storage apparatus 1700 capable of processing a SCSI standard Reserve command is connected to the virtual storage apparatuses 1000L, 1000R, and comprises a failure detection volume 1800.

If the virtual storage apparatus 1000L detects a failure, it writes a failure information flag showing the detection of a failure in a sub block of the failure detection volume 1800 (failure detection virtual volume 3000C) that was set during the creation of a pair of the primary volume and secondary volume of remote copy, and thereafter continues the I/O processing to the host 1100.

Specifically, when the virtual storage apparatus 1000L detects a remote copy error, it reserves the failure detection volume 1800 with the Reserve command (exclusively secures the failure detection volume 1800 so that the other apparatuses will not be able to access the failure detection volume 1800) before sending an I/O reply to the host 1100.

Subsequently, the virtual storage apparatus 1000L reads a sub block of the failure detection volume 1800 that was set during the creation of a pair of the primary volume and secondary volume of remote copy, checks whether a failure information flag is written and writes a failure information flag in that sub block if a failure information flag is not written.

Subsequently, the virtual storage apparatus 1000L cancels the reservation of the failure detection volume 1800 with a Reserve cancellation command, changes to the failure Suspend status and stops the remote copy, and resumes the I/O processing to the host 1100. Meanwhile, if the virtual storage apparatus 1000L is not able to reserve the failure detection volume 1800 for a given period of time, or a failure information flag has already been written by the other virtual storage apparatus 1000R, it replies an I/O error to the host 1100.

Meanwhile, if an I/O request is issued from the host 1100, the virtual storage apparatus 1000R checks the failure detection volume 1800 (failure detection virtual volume 3000C) of the failure detection storage apparatus 1700 before starting the I/O processing to the host 1100, and starts the I/O processing only when a failure information flag has not been written.

Specifically, when an I/O request is issued from the host 1100 and the virtual storage apparatus 1000R receives such I/O request, the virtual storage apparatus 1000R reserves the failure detection volume 1800 with a Reserve command before sending an I/O reply to the host 1100.

Subsequently, the virtual storage apparatus 1000R reads the sub block of the failure detection volume 1800 that was set during the creation of a pair of the primary volume and secondary volume of remote copy, checks whether a failure information flag is written, and writes a failure information flag in the sub block when a failure flag is not written.

Subsequently, the virtual storage apparatus 1000R cancels the reservation of the failure detection volume 1800 with a Reserve cancellation command, changes to the failure Suspend status and stops the remote copy, and resumes the I/O processing to the host 1100 with the secondary volume. Meanwhile, if the virtual storage apparatus 1000R is not able to reserve the failure detection volume 1800 for a given period of time, or a failure information flag has already been written by the other virtual storage apparatus 1000L, it does not change to the failure Suspend status and replies an I/O error to the host 1100.

6. Example I/O Request Processing of Virtual Storage Apparatus 1000

Figure 5:
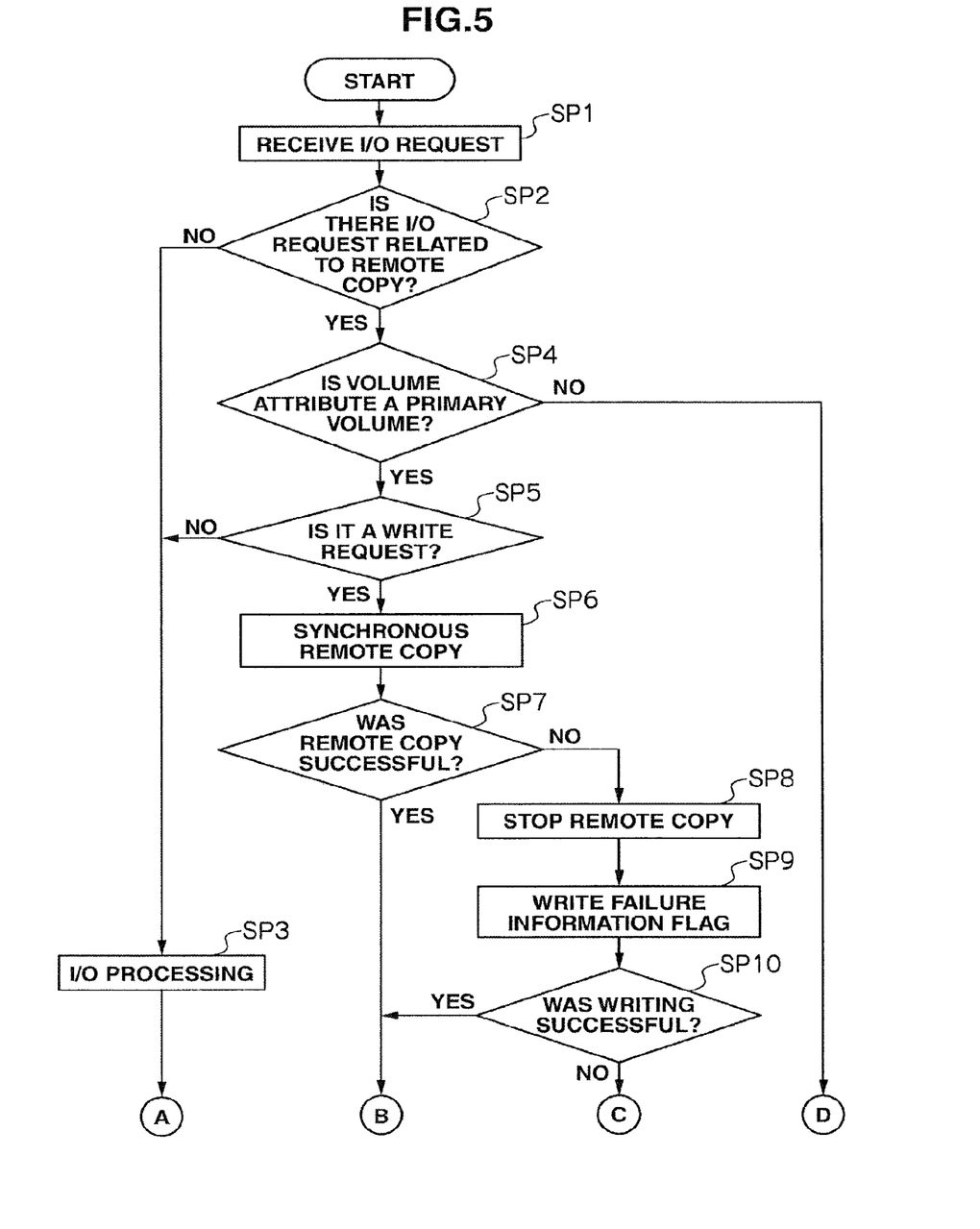
FIG. 5 is a flowchart showing an example I/O request processing.
Figure 6:
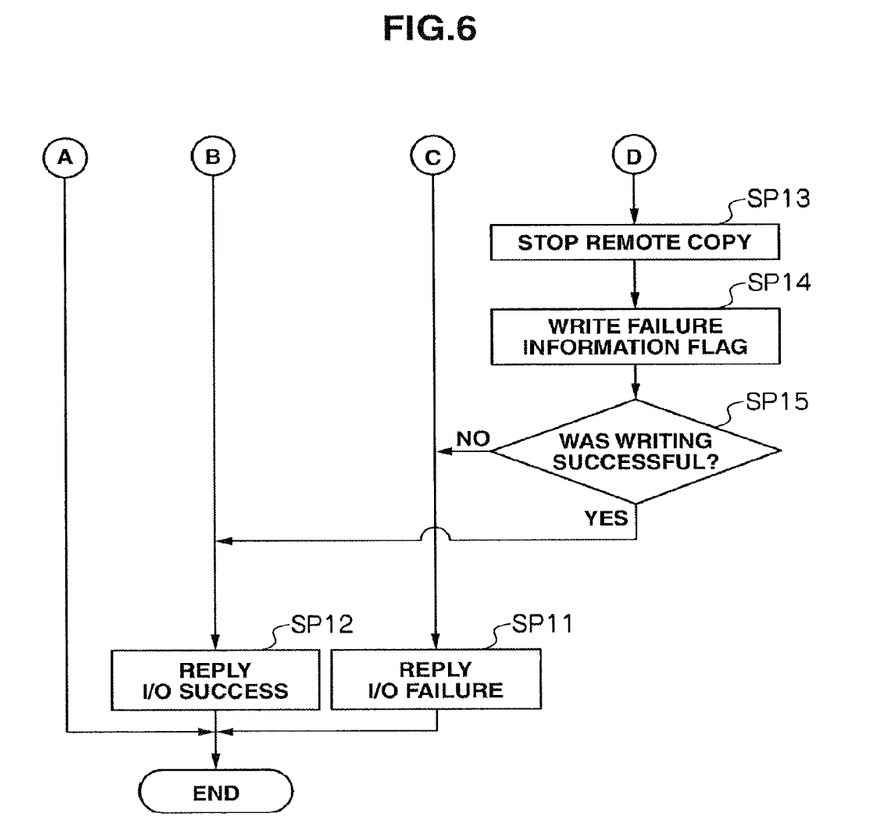
FIG. 6 is a flowchart showing an example I/O request processing.

FIG. 5 and FIG. 6 are diagrams showing an example operation of remote copy to be executed by the I/O processing program 6020 when the virtual storage apparatus 1000 receives an I/O request.

(SP1) The virtual storage apparatus 1000 receives an I/O request.

(SP2) The virtual storage apparatus 1000 determines whether the volumes volume 3000A, 3000B subject to the I/O request are in a remote copy relationship, executes SP3 if they are unrelated, and executes SP4 if they are related.

(SP3) The virtual storage apparatus 1000 performs the corresponding I/O processing, returns an I/O success reply or I/O error reply to the host 1100, and then ends the processing.

(SP4) The virtual storage apparatus 1000 determines the attribute of the volumes 3000A, 3000B of remote copy subject to the I/O request, executes SP5 if it is a primary volume attribute and executes SP6 if it is a secondary volume attribute. Here, the virtual storage apparatus 1000L with the primary volume is the high priority virtual storage apparatus 1000. Moreover, if an I/O request is issued to the virtual storage apparatus 1000R with the secondary volume, this is a case where a failure has occurred in the virtual storage apparatus 1000L with the primary volume and, in this case, the remote copy is not operating.

(SP5) The virtual storage apparatus 1000 determines the contents of the I/O subject to the I/O request, and executes SP3 if it is a read request and executes SP6 if it is a write request.

(SP6) The virtual storage apparatus 1000 executes the synchronous remote copy processing, transfers write data to the virtual storage apparatus 1000R, and waits for a reply.

(SP7) The virtual storage apparatus 1000 determines whether the synchronous remote copy processing was successful, and executes SP11 if it is successful and executes SP8 if it is an error.

(SP8) The virtual storage apparatus 1000 changes the copy pair status of the remote copy in which the target volume is a primary volume to the failure Suspend status, and stops the remote copy. In this case, the virtual storage apparatus 1000 does not prohibit the writing of data into that volume.

(SP9) The virtual storage apparatus 1000 writes a failure information flag in the sub block of the failure detection volume 1800 that was set during the creation of a pair of the primary volume and secondary volume of remote copy.

(SP10) The virtual storage apparatus 1000 determines whether the writing of the failure information flag was successful, and executes SP12 if it was successful and executes SP11 is it was an error. If a failure information flag has already been written in the corresponding failure detection volume 1800, since this means that the other virtual storage apparatus 1000 has written the failure information flag, the writing will be an error. Meanwhile, if the other virtual storage apparatus 1000 has not written the failure information flag, the failure information flag is written and the writing will be successful.

(SP12) The virtual storage apparatus 1000 performs the I/O processing (write processing), returns an I/O success reply to the host 1100, and then ends the processing.

(SP11) The virtual storage apparatus 1000 returns an I/O error reply to the host 1100, and then ends the processing. Subsequently, if the host 1100 the retries the foregoing process but still results in an I/O error, it issues an I/O request to the virtual storage apparatus 1000R as the low priority virtual storage apparatus 1000.

(SP13) The virtual storage apparatus 1000 changes the copy pair status of the remote copy in which the target volume is a secondary volume to the failure Suspend status, and stops the remote copy. In this case, the virtual storage apparatus 1000 does not prohibit the writing of data into that volume.

(SP14) The virtual storage apparatus 1000 writes a failure information flag in the sub block of the failure detection volume 1800 that was set during the creation of a pair of the primary volume and secondary volume of remote copy.

(SP15) The virtual storage apparatus 1000 determines whether the writing of the failure information flag was successful, and executes SP12 if it was successful and executes SP11 is it was an error. If a failure information flag has already been written in the corresponding failure detection volume

1800, since this means that the other virtual storage apparatus 1000 has written the failure information flag, the writing will be an error. Meanwhile, if the other virtual storage apparatus 1000 has not written the failure information flag, the failure information flag is written and the writing will be successful.

Like this, with the information system 100, the virtual storage apparatuses 1000L, 1000R respectively set a copy pair of the primary volume and secondary volume in the copy pair information 6040 according to an external command from the management host 1200 or the like, associates the failure detection volume 1800 with that copy pair, sends an I/O request directed to the secondary volume to the virtual storage apparatus 1000R if the I/O request to the primary error ends in an error in the host 1100, and stores the failure information flag in the failure detection volume 1800 if the virtual storage apparatuses 1000L, 1000R detect a failure in the virtual storage apparatuses 1000R, 1000L of the other side or a connection failure between the virtual storage apparatuses 1000L, 1000R.

Accordingly, since an I/O request is sent to the second volume when an I/O request to the first volume ends in an error, it is possible to effectively prevent the execution of processing to an I/O request of the host 1100 based on data of the second volume, which is not up to date, as a result of the remote copy with the first volume not being performed and data of the second volume not being up to date.

Moreover, with the information system 100, when the virtual storage apparatus 1000R receives an I/O request from the host 1100, it determines whether a failure information flag has been written into the failure detection volume 1800 associated with the copy pair corresponding to that I/O request, and sends an I/O request error reply if the failure information flag is written.

Accordingly, since an I/O request is sent to the second volume when an I/O request to the first volume ends in an error, it is possible to effectively prevent the execution of processing to an I/O request of the host 1100 based on data of the second volume, which is not up to date, as a result of the remote copy with the first volume not being performed and data of the second volume not being up to date.

Further, with the information system 100, if the virtual storage apparatus 1000L detects an error in the remote copy to the secondary volume, it determines whether a failure information flag is written in the failure detection volume 1800, writes the failure information flag in the failure detection volume 1800 if the failure information flag is not written, and thereafter executes processing corresponding to the I/O request.

Accordingly, even if a failure occurs in the virtual storage apparatus 1000L, it is possible to notify the virtual storage apparatus 1000R that the remote copy with the primary volume has not been performed and the secondary volume data is not up to date.

In addition, with the information system 100, if the failure information flag is written in the virtual storage apparatus 1000L, it sends an I/O request error reply.

Accordingly, if the failure information flag is written in the failure detection volume 1800, since this shows that the independent operation based on the secondary volume has already been started due to some kind of factor, and that the primary volume data is not up to date, it is possible to prevent the host 1100 from executing processing to the I/O request based on the primary volume data that is not up to date.

Although this example embodiment explained a case of providing the same failure detection volume 1800 as the failure detection virtual volume 3000C to the virtual storage apparatuses 1000L, 1000R, and accessing the failure detection volume 1800, the present invention is not limited to the foregoing configuration, and, without providing the failure detection virtual volume 3000C, the virtual storage apparatuses 1000L, 1000R may also directly access the failure detection volume 1800 of the failure detection storage apparatus 1700, and various other methods may also be adopted.

What is claimed is:

1. An information system, comprising:
 a first storage apparatus connected to a host computer and including a first volume designated by a volume identifier;
 a second storage apparatus connected to the host computer the including a second volume designated by the same said volume identifier as for the first volume; and
 a failure detection storage apparatus connected to the first storage apparatus and the second storage apparatus, and including a third volume;
 wherein, for back up purposes, the first volume and the second volume form a remote copy pair, where write data to the first volume is copied to the second volume, and the third volume is associated with the remote copy pair;
 wherein, for I/O request purposes, the first volume and the second volume are recognized in the information system as a single volume labeled with the same said volume identifier, but accessible by alternative access paths designated with differing priorities;
 wherein, a priority of a first access path from the host computer to the first volume is higher than a priority of a second access path from the host computer to the second volume;
 wherein, when the host computer sends an I/O request designating the same said volume identifier, the I/O request is first sent to the first volume though the first access path;
 wherein, when the I/O request sent to the first volume through the first access path ends in an error, the I/O request is then sent to the second volume thorough the second access path;
 wherein, upon receiving a write request sent to from the host computer to the second volume through the second access path, the second storage apparatus suspends the remote copy, processes the write request and stores a write location of data recorded in the second volume based on the write request;
 wherein, if one of the first and second storage apparatus detects a failure in the other or a connection failure between the first and second storage apparatuses, the first or the second storage apparatus detecting the failure stores, in the third volume, a failure information flag showing that the failure was detected;
 wherein, upon receiving the I/O request through the second access path, the second storage apparatus determines whether the failure information flag is stored in the third volume, and sends an error reply of the I/O request to the host computer if the failure information flag is stored in the third volume.

2. The information system according to claim 1, wherein:
 the first storage apparatus includes a fourth volume designated by a second volume identifier;
 the second storage apparatus includes a fifth volume designated by the same said second volume identifier as for the fourth volume;
 wherein, for back up purposes, the fourth volume and the fifth volume form a second remote copy pair, write data to the fourth volume is copied to the fifth volume, and the third volume is associated with the second remote copy pair;

wherein, for I/O request purposes, the fourth volume and the fifth volume are recognized in the information system as a single volume labeled with the same said second volume identifier, but accessible by alternative access paths designated with differing priorities wherein, a priority of a third access path from the host computer to the fourth volume is lower than a priority of a fourth access path from the host computer to the fifth volume;

wherein, when the host computer sends an I/O request designating the same said second volume identifier, the I/O request is first sent to the fifth volume though the fourth access path;

wherein, when the I/O request sent to the fifth volume through the fourth access path ends in an error, the I/O request is then sent to the fourth volume thorough the third access path;

wherein, upon receiving a write request sent to from the host computer to the fourth volume through the third access path, the first storage apparatus suspends the remote copy, processes the write request and stores a write location of data recorded in the fourth volume based on the write request;

wherein, upon receiving the I/O request through the third access path, the first storage apparatus determines whether the failure information flag is stored in the third volume, and sends an error reply of the I/O request to the host computer if the failure information flag is stored in the third volume.

3. The information system according to claim 1, wherein: if the first storage apparatus receives inquiry command, information regarding access path priority is returned responsive to the inquiry command.

4. The information system according to claim 1, wherein, upon receiving the I/O request from the host computer, the second storage apparatus stores the failure information flag in the third volume if the failure information flag is not stored in the third volume, and thereafter executes processing corresponding to the I/O request.

5. The information system according to claim 1, wherein, upon detecting an error in the remote copy to the second volume, the first storage apparatus determines whether the failure information flag is stored in the third volume, stores the failure information flag in the third volume if the failure information flag is not stored in the third volume, and thereafter executes processing corresponding to the I/O request.

6. The information system according to claim 1, wherein, upon receiving the I/O request from the host computer, the first storage apparatus sends an error reply of the I/O request to the host computer if the failure information flag is stored in the third volume.

7. The information system according to claim 1, further comprising:

a fourth-volume storage apparatus connected to the first storage apparatus, configured from a plurality of storage devices, a controller and a cache memory, and including a fourth volume configured from a partial area of the plurality of storage devices; and a fifth-volume storage apparatus connected to the second storage apparatus, configured from a plurality of storage devices, a controller and a cache memory, and including a fifth volume configured from a partial area of the plurality of storage devices;

wherein the first storage apparatus defines a first virtual volume as a virtual volume in which its substance exists in the fourth volume of the fourth-volume storage apparatus;

wherein the second storage apparatus defines a second virtual volume as a virtual volume in which its substance exists in the fifth volume of the fifth-volume storage apparatus;

wherein the first and the second storage apparatuses respectively and internally set a remote copy pair for copying data of the first virtual volume to the second virtual volume, and associate the third volume with the remote copy pair; and wherein, when an I/O request to the first virtual volume ends in an error, the host computer sends an I/O request directed to the second virtual volume to the second storage apparatus.

8. The information system according to claim 1, wherein the first and the second storage apparatuses define a third virtual volume as a virtual volume in which its substance exists in the third volume of the failure detection storage apparatus; and wherein, upon receiving the I/O request from the host computer, the second storage apparatus determines whether the failure information flag is stored in the third virtual volume associated with the remote copy pair corresponding to the I/O request, and sends an error reply of the I/O request to the host computer if the failure information flag is stored in the third virtual volume.

* * * * *